US011343665B2

(12) United States Patent
Wong et al.

(10) Patent No.: US 11,343,665 B2
(45) Date of Patent: May 24, 2022

(54) VEHICLE-TO-EVERYTHING SERVER DISCOVERY

(71) Applicant: Nokia Technologies Oy, Espoo (FI)

(72) Inventors: Curt Wong, Bellevue, WA (US); Devaki Chandramouli, Plano, TX (US); Xiang Xu, Nanjing (CN); David Navratil, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 577 days.

(21) Appl. No.: 16/087,091

(22) PCT Filed: Mar. 31, 2016

(86) PCT No.: PCT/US2016/025332
§ 371 (c)(1),
(2) Date: Sep. 20, 2018

(87) PCT Pub. No.: WO2017/171806
PCT Pub. Date: Oct. 5, 2017

(65) Prior Publication Data
US 2021/0185504 A1    Jun. 17, 2021

(51) Int. Cl.
*H04W 8/00*        (2009.01)
*H04W 76/11*       (2018.01)
(Continued)

(52) U.S. Cl.
CPC ............. *H04W 8/005* (2013.01); *H04W 4/06* (2013.01); *H04W 4/40* (2018.02); *H04W 76/11* (2018.02); *H04W 84/042* (2013.01)

(58) Field of Classification Search
CPC ....... H04W 8/005; H04W 76/11; H04W 4/40; H04W 4/06; H04W 84/042
(Continued)

(56) References Cited

U.S. PATENT DOCUMENTS

2014/0358414 A1    12/2014  Ibrahim et al.
2015/0304122 A1*   10/2015  Pazos .................. H04L 12/1845
                                                    370/312
(Continued)

FOREIGN PATENT DOCUMENTS

EP          2461545 A1    6/2012
WO      2015/142082 A1    9/2015

OTHER PUBLICATIONS

"3rd Generation Partnership Project; Technical Specification Group Services and System Aspects; Study on architecture enhancements for LTE support of V2X services (Release 14)", 3GPP TR 23.785, V0.2.0, Feb. 2016, pp. 1-21.

(Continued)

*Primary Examiner* — Mong-Thuy T Tran
(74) *Attorney, Agent, or Firm* — Nokia Technologies Oy (57) ABSTRACT

Methods and apparatus, including computer program products, are provided for V2X server discovery. In some example embodiments, there may be provided a method. The method may include receiving, by a user equipment, an indication of an identity of a local server configured to provide, in the serving public land mobile network, information regarding a vehicle-based service, when the user equipment enters a region of the serving public land mobile network; and discovering, by the user equipment, the local server based on the received indication of the identity. Related systems, methods, and articles of manufacture are also disclosed.

20 Claims, 5 Drawing Sheets

(51) Int. Cl.
*H04W 4/40* (2018.01)
*H04W 4/06* (2009.01)
*H04W 84/04* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2015/0327157 | A1* | 11/2015 | Al-Shalash | H04W 72/1263 370/328 |
| 2016/0128116 | A1* | 5/2016 | Kim | H04W 4/70 370/329 |
| 2016/0381699 | A1* | 12/2016 | Rubin | H04L 1/0027 370/329 |
| 2017/0332309 | A1* | 11/2017 | Chen | H04W 48/16 |
| 2018/0159935 | A1* | 6/2018 | Cavalcanti | H04W 4/80 |
| 2018/0192268 | A1* | 7/2018 | Xu | H04W 4/06 |
| 2018/0206089 | A1* | 7/2018 | Cavalcanti | H04W 36/00837 |
| 2018/0242115 | A1* | 8/2018 | Kim | H04W 4/40 |
| 2018/0279095 | A1* | 9/2018 | Xu | H04W 4/40 |
| 2018/0295655 | A1* | 10/2018 | Cavalcanti | H04W 12/35 |
| 2019/0014515 | A1* | 1/2019 | Zee | H04W 76/27 |
| 2019/0028862 | A1* | 1/2019 | Futaki | H04W 92/18 |
| 2019/0058981 | A1* | 2/2019 | Xu | H04W 4/06 |
| 2019/0104386 | A1* | 4/2019 | Kim | H04W 76/11 |
| 2019/0124489 | A1* | 4/2019 | Ahmad | H04W 4/40 |
| 2019/0364392 | A1* | 11/2019 | Xu | H04W 4/40 |

OTHER PUBLICATIONS

"3rd Generation Partnership Project; Technical Specification Group Services and System Aspects; Study on LTE support for Vehicle to Everything (V2X) services (Release 14)", 3GPP TR 22.885, V14.0.0, Dec. 2015, pp. 1-50.

"3rd Generation Partnership Project; Technical Specification Group Services and System Aspects; Group Communication System Enablers for LTE (GCSE_LTE); Stage 2 (Release 13)", 3GPP TS 23.468, V13.3.0, Dec. 2015, pp. 1-30.

Gao et al., "Automotive V2X on Phones: Enabling Next-Generation Mobile ITS Apps", Design, Automation & Test in Europe Conference & Exhibition (DATE), Mar. 14-18, 2016, 6 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401, V13.6.1, Mar. 2016, pp. 1-365.

International Search Report and Written Opinion received for corresponding Patent Cooperation Treaty Application No. PCT/US2016/025332, dated Sep. 15, 2016, 13 pages.

"Discussion on V2X Architecture", 3GPP TSG RAN WG3 Meeting #91, R3-160226, Agenda Item: 12.2, CATT, Feb. 15-19, 2016, pp. 1-3.

"Local V2X Server Discover", TSG SA WG2 Meeting #114, S2-161691, Agenda Item: 6.13, Nokia, Apr. 11-15, 2016, pp. 1-2.

"Conclusion for Local V2X Server Discovery", SA WG2 Meeting #116, S2-163756, Agenda Item: 6.13, LG Electronics, Jul. 11-15, 2016, pp. 1-5.

"Localized Uu Based V2X Architecture Concerning on Embms", 3GPP TSG-RAN WG3 #91, R3-160206, Agenda item: 12.2, ZTE, Feb. 15-19, 2016, 6 pages.

"MBMS Latency and Capacity Analysis for V2X", 3GPP TSG-RAN WG2 #92, Tdoc R2-156639, Agenda Item: 7.11, Ericsson, Nov. 16-20, 2015, pp. 1-12.

"3rd Generation Partnership Project; Technical Specification Group Services and System Aspects; Study on LTE support for V2X services (Release 14)", 3GPP TR 22.885, V1.1.0, Nov. 2015, pp. 1-52.

Office action received for corresponding European Patent Application No. 16717022.4, dated Jul. 5, 2021, 6 pages.

"Considerations on eNB type RSU and UE type RSU", 3GPP TSG RAN WG2 #93, R2-161163, Agenda : 7.11, ZTE, Feb. 15-19, 2016, 6 pages.

* cited by examiner

VEHICLE-TO-EVERYTHING SERVER DISCOVERY

RELATED APPLICATION

This application was originally filed as PCT Application No. PCT/US2016/025332 filed Mar. 31, 2016.

FIELD

The subject matter described herein relates to vehicle-to-everything communications.

BACKGROUND

In vehicle-to-everything (V2X), vehicles may be equipped with user equipment configured to wirelessly communicate with other user equipment, such as vehicle-to-vehicle (V2V) user equipment, vehicle-to-network nodes (V2N), vehicle-to-pedestrian (V2P), and/or any other device. The V2X messages may be used to exchange messages, such as traffic related messages, alerts, autonomous or semi-autonomous driving messages, and/or any other type of data or message. For example, a V2X message may be sent from a first vehicle (or a node or a server in the network) to other nearby vehicles warning the other vehicles of a hazardous traffic condition. Mobile network may be used to provide V2X messages dissemination to allow more efficient means to carry the message from one vehicle to other vehicles with a network feature, such as Multimedia Broadcast Multicast Services (MBMS). In the Third Generation Partnership Project (3GPP), MBMS relates to broadcast and multicast services provided via cellular. Specifically, a broadcast transmission may be provided over one or more cells to user equipment. For example, the cellular network may provide an application or service, such as mobile television, to a user equipment using for example a multicast broadcast single-frequency network (MBSFN) in which base stations transmit on the same frequency in a coordinated way to provide the mobile television broadcast.

SUMMARY

Methods and apparatus, including computer program products, are provided for V2X server discovery.

In some example embodiments, there may be provided a method. The method may include receiving, by a user equipment, an indication of an identity of a local server configured to provide, in the serving public land mobile network, information regarding a vehicle-based service, when the user equipment enters a region of the serving public land mobile network; and discovering, by the user equipment, the local server based on the received indication of the identity.

In some variations, one or more of the features disclosed herein including the following features can optionally be included in any feasible combination. The indication may identify the local server from at least another local server, wherein the local server is configured to support the region of the serving public land mobile network, and wherein the at least one other local server is configured to support at least one other region of the serving public land mobile network. The local server may be configured to provide information regarding the vehicle-based service via at least a multimedia broadcast multicast services session in the serving public land mobile network associated with the local server. The indication may include a fully qualified domain name of the local server. The local server may include a vehicle-to-everything local server configured to provide at least user service description information for the vehicle-based service. The user equipment may receive the user service description information from the vehicle-to-everything local server and access the vehicle-based service provided by the multimedia broadcast multicast services session, wherein the accessing is based at least on the received user service description information. The indication may be carried by a system information block transmitted by a base station in the serving public land mobile network. The indication may be carried by a multicast control channel, a multimedia broadcast multicast services control channel, a single cell multimedia broadcast multicast services control channel, and/or a multicast traffic channel. The indication may be in a common format accessible by other user equipment in other serving public land mobile networks. The discovering may further include requesting, from a home network, access to the local server and/or to the vehicle-based service, when the user equipment enters the region of the serving public land mobile network and receiving, in response to the requesting, the indication of the identity of the local server, when the subscription information for the user equipment indicates that the user equipment is allowed to access the vehicle-based service. The discovering may further include requesting, from the local server, access to the local server, when the user equipment enters the region of the serving public land mobile network, and receiving, in response to the requesting, access to the local server, when the subscription information for the user equipment indicates that the user equipment is allowed to access the local server including the vehicle-based service.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

As part of V2X, 3GPP TR 22.885 may specify that the user equipment within an area should be able to communicate with other user equipment regardless of which public land mobile network (PLMN) the user equipment is associated with. For example, a user equipment supporting a V2X service may be able to transmit and/or receive certain information, such as V2X messages from other user equipment supporting a V2X service in another, different public land mobile network. To illustrate further, V2X may provide for the exchange among vehicles of position or other information carried by V2X messages, such as Cooperative Awareness Messages (CAMs). Likewise, the network, such as the 3GPP system, should be able to support V2X message transfer among user equipment regardless of whether the user equipment are served by the same or different public land mobile network supporting a V2X service.

Although some of the examples described herein refer to V2X service, the subject matter disclosed herein may be used with other services including other vehicle-based or non-vehicle-based services.

Figure 1:
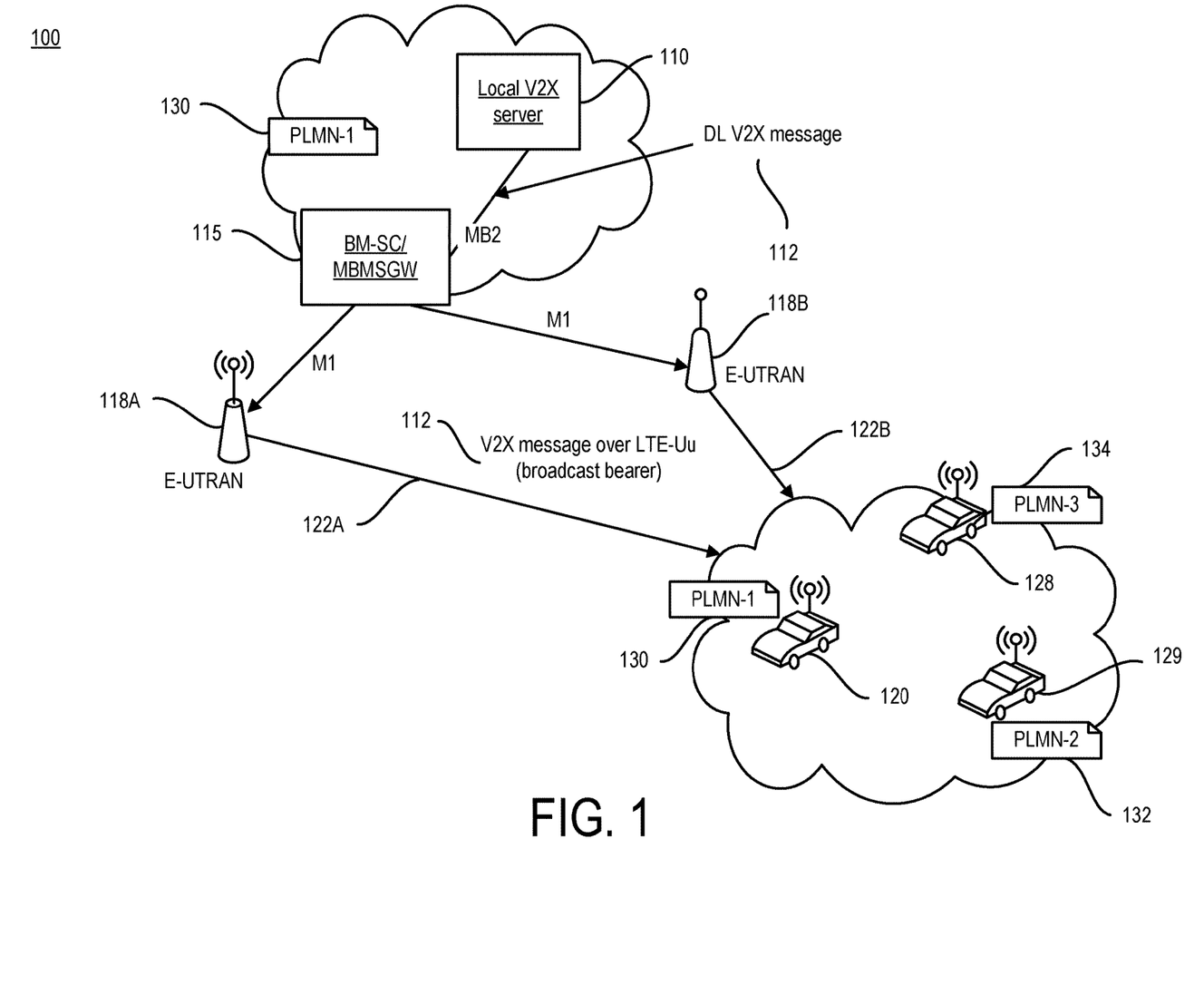
FIG. 1 depicts an example of a system including a V2X local server, in accordance with some example embodiments.

FIG. 1 depicts an example system 100, in accordance with some example embodiments.

The system 100 may include a source of data, such as V2X message 112, a first public land mobile network (PLMN-1) 130 having an associated local V2X server 110, a Broadcast Multicast Service Center (BM-SC)/Multimedia Broadcast Multicast Services (MBMS) gateway (GW) 115, which couples to E-UTRAN providing data such as an MBMS broadcast 122A-B to a user equipment 120 in the first public land mobile network 130.

Although FIG. 1 depicts a MBMS broadcast, carrying the V2X messages, the V2X messages may be carried in other ways including other radio access technologies such as a unicast, a point-to-point link, an ad hoc link, and/or other radio technologies. As used herein, EUTRAN 118A and B may each include a base station and/or a multi-cell/multicast coordination entity (MCE).

In the example of FIG. 1, broadcast bearers, such as evolved MBMS bearers 122A-B, may be used to deliver data such as a V2X message 112 over a localized area within first public land mobile network 130. The V2X message 112 may be sent via a local V2X server 110, and this message 112 may be sent via an MB2 interface as defined in Group Communication System Enablers (GCSE, see, for example, 3GPP TS 23.468) to distribute the data to a certain area using the MBMS services in the first public land mobile network 130.

FIG. 1 shows V2X capable user equipment 128 and 129 with subscriptions from different public land mobile networks, such as the second public land mobile network (public land mobile network-2) 132 and the third public land mobile network 134, when compared to user equipment 120 associated with the first public land mobile network 130.

As noted, the BM-SC 115 may be configured to receive data, such as video streams, messages, V2X messages, and/or the like, for broadcast via MBMS-GW 115, although as noted the data may be carried using mechanisms other than MBMS. The BM-SC 115 may provide a gateway function between a service network providing the data (for example, V2X message 112 and/or any other data source) and the radio network providing radio service such as the MBMS service, which may be a single frequency network (SFN) transmission for example. The BM-SC 115 may be configured in accordance with 3GPP TS 23.468, although other implementations may be used as well.

In the case of 3GPP TS 23.468, the BM-SC 115 may provide services such as application layer forward error correction to received data that is to be forwarded to the radio network for broadcast as well as other services. The MBMS-GW 115 may also provide an IP multicast on an interface such as the M1 interface between the MBMS-GW 115 and the E-UTRAN 118A-B. The MBMS-GW 115 may route MBMS session control signaling to other nodes, such as mobility management entities, which may forward session control messages to a multi-cell/multicast coordination entity (MCE), which is part of the E-UTRAN to initiate a given MBMS session. The MCE may configure the SFN areas. Moreover, the E-UTRAN 118A-B may be configured to broadcast MBMS user data including User Service Description (USD, which provides content schedule information for a MBMS) and/or MBMS-related control signaling to the user equipment.

The system 100 may include a server 110, such as a local vehicle-to-everything (V2X) server. The local V2X server 110 may provide, as noted, information, such as a downlink V2X message 112, for transmission via gateway 115 to a user equipment 120. The downlink V2X message 112 may provide information to the user equipment, and this information may be needed by the user equipment in order to access a service provided via the MBMS. For example, the V2X message 112 may include User Service Data information that enables the user equipment to access content on the V2X service provided by the MBMS session.

The E-UTRAN 118A-B may provide at least one radio bearer, such as a broadcast bearer, an evolved MBMS bearer, and/or the like, to carry the V2X message 112 to a localized area within the first public land mobile network 130. In this example, the V2X message 112 may be sent from local V2X server 110 using MB2 interface (which may be defined in accordance with 3GPP TS 23.468) to distribute the data to a specific area served by the first public land mobile network 130. User equipment 120 (which in this example represents a V2X capable vehicle such as a car, motorcycle, and/or the like) may be configured to receive, via the broadcast, the V2X message 112. In accordance with some example embodiments, cars including user equipment 128, 129 with subscriptions from different public land mobile networks 132, 134 may also be able to receive the V2X message 112 being broadcasted via the first public land mobile network 130. To illustrate further, the local V2X server 110 may store and send V2X messages 112 regarding the position of other vehicles, hazards, and/or other aspects that may be relevant to the vehicles 120, 128, and 129. This content at the local V2X server 110 may be obtained from other vehicles (which may include vehicles 120, 128, and 129), a master V2X server, and/or other sources of data.

The user equipment 120 may be able to retrieve and/or receive User Service Data. The User Service Data may include, as noted, information, such as content schedule, formatting or encryption information, and/or the like, to enable the user equipment 120 to receive and/or read V2X messages and/or MBMS data from the V2X server 110, and this may be received via a standard interface such as a GC1 interface in accordance with for example 3GPP TS 23.468.

Figure 2:
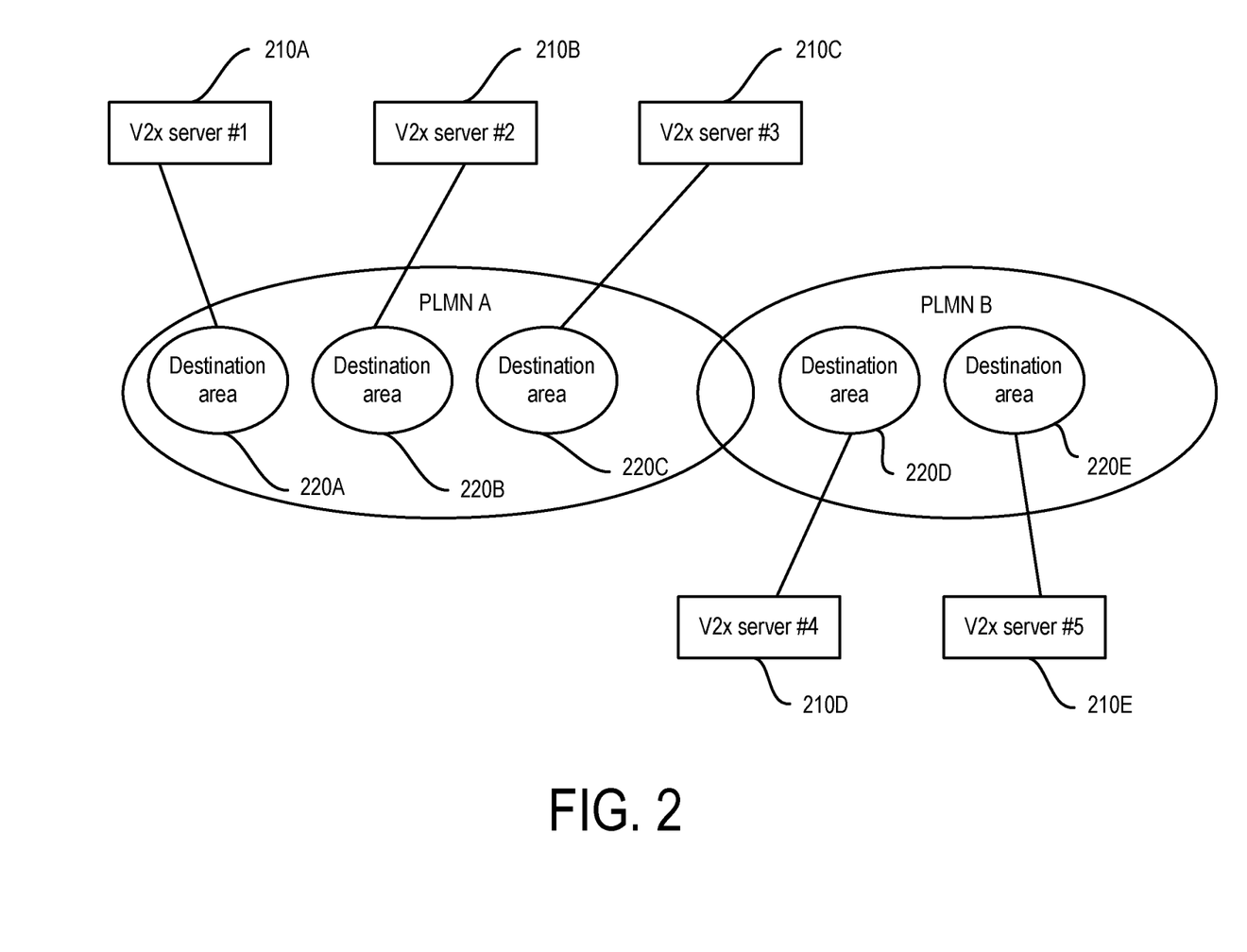
FIG. 2 depicts an example of a plurality of V2X local servers, in accordance with some example embodiments.

To retrieve or receive USD, the user equipment 120 may need to discover the address of a V2X server 110. In a V2X framework, each V2X server may serve a certain geographical area, so a user equipment may need to discover a local V2X server such as the local V2X server 110 serving a given area in a given public land mobile network. For example, when user equipment 120 enters a given geographical area, the user equipment may need to discover the local V2X server 110 in order to obtain the USD or other information from the local V2X server 110. To illustrate further, FIG. 2 shows first public land mobile network 130 including a plurality of local V2X servers 210A-C, each of which serves a different area 220A-C. And, the local V2X servers 210A-C may provide USD information to one or more user equipment in the first public land mobile network 130 including regions 220A-C, while local V2X servers 210D-E may provide USD information to one or more user equipment in the second public land mobile network 132 including regions 220D-E. As a user equipment travels along a road for example, the user equipment 120, 128, 129 may enter each of the regions 220A-E and, as such, may need to discover each of the local servers 210A-E in order to be able to communicate with the local servers and to access a V2X service carried the MBMS in each region.

In some example embodiments, the local V2X server discovery process may allow the user equipment 120, 128, 129 to find a correct local V2X server from among the V2X servers 210A-E. Once discovered, the local V2X server may provide to the user equipment 120, 128, 129 the appropriate USD to enable proper reception of content information carried by the V2X messages/MBMS broadcast while in the area corresponding to the local V2X server. Moreover, the local V2X server may also allow the user equipment to send a V2X message in the uplink direction to the corresponding local V2X server for the region serving the user equipment.

In some example embodiments, a common MBMS channel may be transmitted or broadcast carrying information, such as USD, in a format or configuration that can be read by a user equipment as it traverses each of the areas 220A-E. For example, both public land mobile networks 130 and 132 may transmit a message carrying USD via the same, given frequency band (which may be allocated to V2X), may use the same format, and/or may use the same encryption method for securing the message carrying USD. The message carrying USD may be a V2X message.

In some example embodiments, the user equipment 120, 128, 129 may receive a local V2X server address during an attachment procedure to a network, during a tracking area update procedure, and/or during activation of a packet data network gateway.

In some example embodiments, when the user equipment 120, 128, 129 arrives in an area, such as a cell or other area being served by an access point or base station, the user equipment 120, 128, 129 may dynamically discover a local V2X server serving that area. The discovery may be dynamic in the sense that the user equipment 120, 128, 129 discovers the local V2X server when needed such as when the user equipment 120, 128, 129 enters a certain area such as area 220B. The following provides examples of ways, in accordance with some example embodiments, to indicate the location or identity of a local V2X server (having for example USD) to the user equipment 120, 128, 129 in order allow the user equipment 120, 128, 129 to discover the local V2X server.

In some example embodiments, a base station, such as an E-UTRAN base station, may transmit an identity or a location of a local V2X server. This transmitted information may be in the form of a fully qualified domain name (FQDN) of the local V2X server, such as local V2X server 110. The base station may transmit the identity or the location of the local V2X server in system information, such as in a system information block (SIB 1, SIB13, or in another SIB). Alternatively or additionally, the network may provide the identity or the location of the local V2X server via a multicast control channel, such as a MBMS control channel (MCCH), a single cell MCCH (SC-MCCH), and/or other types of channels. Alternatively or additionally, the network may provide the identity or the location of the local V2X server via a multicast traffic channel (similar to MBMS service announcement). As such, the transmission of the identity or location of the local V2X server may allow some, if not all of, the user equipment, such as user equipment 120, 128, and 129 (regardless of subscription to a particular PLMN or limited service state) to discover a local V2X server via the transmission. If a given user equipment is in a limited service state in an LTE network for example, the user equipment may reach the V2X server via another radio access technology such as GPRS, 3G, Wi-Fi, and/or the like to obtain the USD form the local V2X server and thus enable the user equipment to receive the MBMS broadcast.

In some example embodiments, a home public land mobile network (HPLMN) may control access to a V2X services.

In some example embodiments, a home public land mobile network may be configured to not allow a visited public land mobile network (VPLMN) to offer V2X services to a given user equipment (or its user) without some form of control by the given user equipment's home public land mobile network. After a user equipment is authenticated by its home public land mobile network for example, the home public land mobile network may include information such as subscription information for the user equipment or its user. This subscription information may indicate whether a given user equipment's subscription is valid for a V2X service.

Figure 3:
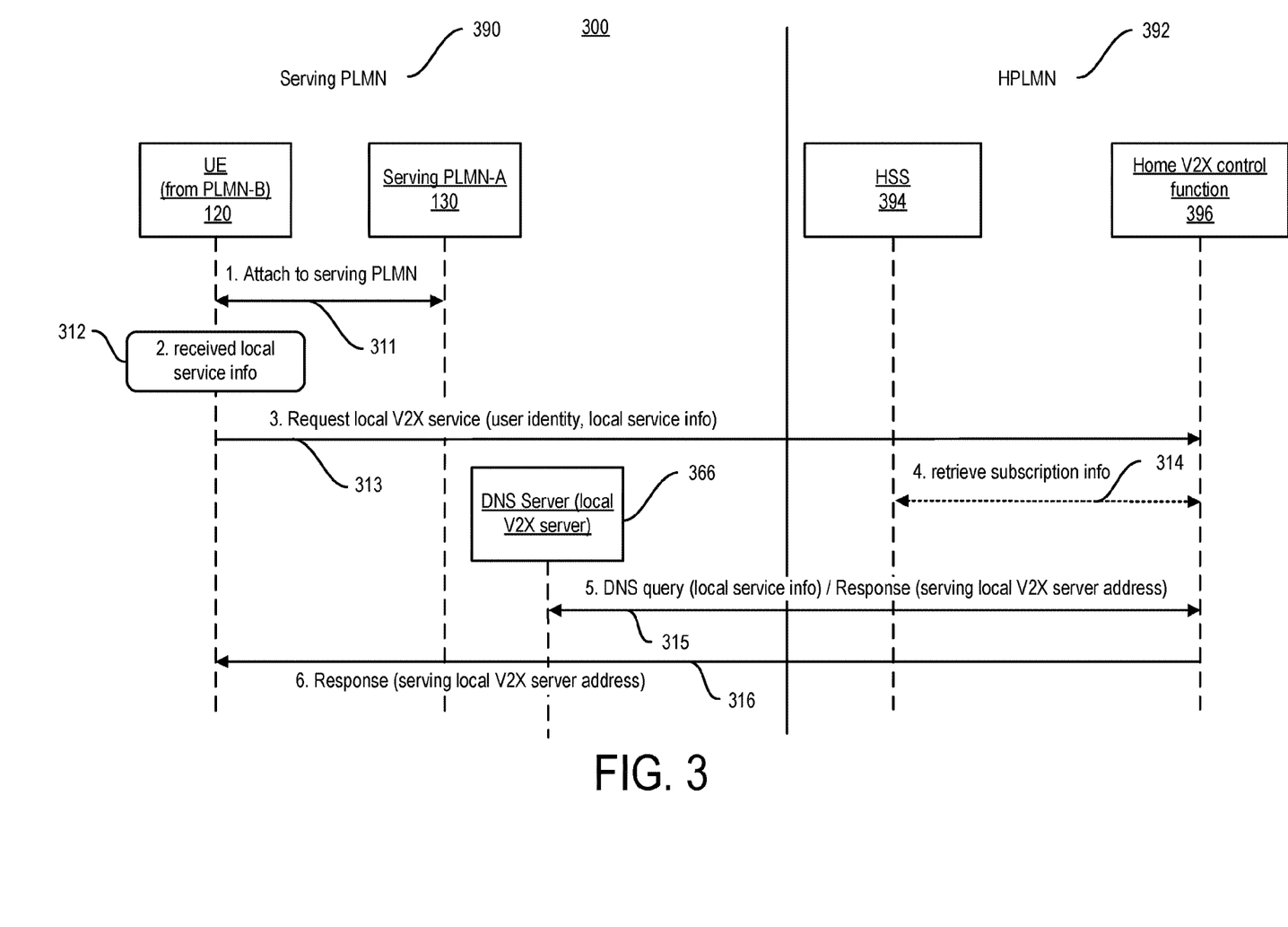
FIG. 3 depicts an example process for controlling V2X service access, in accordance with some example embodiments.

FIG. 3 depicts an example of a process 300 for home public land mobile network control of access to V2X information, in accordance with some example embodiments. The description of FIG. 3 also refers to FIG. 1.

Process 300 depicts a serving public land mobile network 390 such as the first public land mobile network 130 and a user equipment 120 (which is entering the first public land mobile network 130 from the second public land mobile network 132). Process 300 also depicts a home public land mobile network 392 including a home subscriber server (HSS) 394 and a home V2X control function server 396.

At 311, the user equipment 120 may attach to the first public land mobile network 130, in accordance with some example embodiments. For example, the user equipment 120 may initiate an attach procedure with network 130 by sending an attach message in accordance with 3GPP TS 23.401, although the attachment may be in accordance with other standards as well.

At 312, the user equipment 120 may receive information regarding local service information necessary to request the local V2X server access from a home V2X control function server 396, in accordance with some example embodiments. The local service information may indicate the location of the UE 199, and may comprise a locally known label or a location information, such as an E-UTRAN cell global identifier (ECGI), a tracking area code (TAC), a service area identifier (SAI), a zip-code, a postal address, coordinate information (for example, X-Y or latitude and longitude), and/or the like.

In the example of FIG. 3, the serving public land mobile network 130 may not broadcast the local V2X server address but instead broadcast an indicator or a label that the home public land mobile network 392 can use to identify the corresponding public land mobile network serving the user equipment and the corresponding local V2X server address. Alternatively or additionally, the local service information can be one or more identifiers (e.g., an E-UTRAN Cell Global Identifier (ECGI), a tracking area code (TAC), service area identifier (SAI), and/or the like) to identify at least one area within local serving public land mobile network.

At 313, the user equipment may send a request for access to the local V2X server, in accordance with some example embodiments. For example, the user equipment 120 may send the request to the home public land mobile network 392 including the home V2X control function server 396. The request may indicate the location or identity of the serving public land mobile network 130 and the user identity for requesting V2X service. The user identity may include the UE's identity and/or an application-level user identity to enable server 396 to determine if the user equipment 120 has a V2X service subscription and/or is allowed to use a V2X service in the serving public land mobile network. The user equipment 120 may be a subscriber to the home public land mobile network 392 hosting the home V2X control function server 396. If the V2X control function is hosted by a $3^{rd}$ party service provider and not present in the HPLMN, the V2X control function may require the user equipment to be a subscriber of the V2X service in addition to being a subscriber of the HPLMN. In some example embodiments, the user equipment 120 may have, or be provided with, the identity of the home public land mobile network 392 and/or the address of the home V2X control function server 396. For example, the address of home V2X control function server 396 may be pre-configured at the user equipment 120 or in its universal integrated circuit card (UICC), subscribed identity module (SIM), and or the like (for example, the address may be configured via a device management protocol such as Open Mobile Alliance Device Management, OMA-DM).

At 314, the home V2X control function server 396 may access (or interact with) the home subscriber server 394 to obtain subscription information related to user equipment 120 (which seeks use of the local V2X server associated with serving public land mobile network 130). In some instances, the home V2X control function server 396 may not need to access home subscriber server 394 (for example, home V2X control function server 396 may have the information stored in a local cache or database).

At 315, the home V2X control function server 396 may request the local V2X server information from the serving public land mobile network 390, when the home V2X control function server allows this service. For example, the home V2X control function server 396 may send a domain name service 366 query (based on the local service information received from the user equipment) for the local V2X server in the serving network, if or when the server 396 allows this service. The response from the domain name service server 366 may include the local V2X server address in the serving network that user equipment 120 needs in order to contact for V2X service in the area 130. In some instances, the serving public land mobile network 390 may reject the domain name service query 315 from the home public land mobile network 392 if for example there is no service agreement between networks (for example, between the public land mobile networks or the corresponding network operators).

At 316, the home V2X control function server 396 may return to user equipment 120 the local V2X server address in the serving network to enable the user equipment 120 to locate the local V2X server associated with the first public land mobile network area 130.

Figure 4:
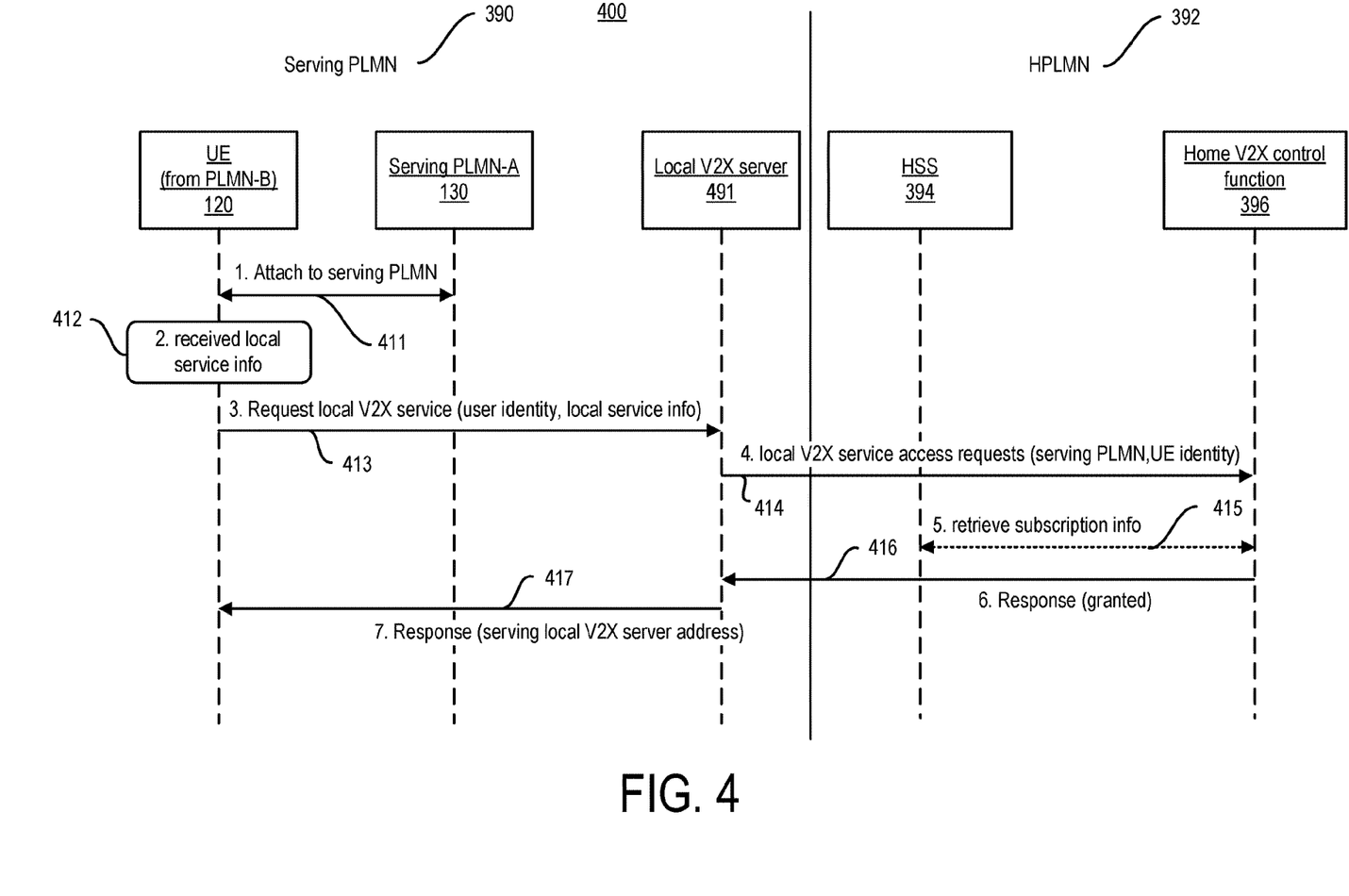
FIG. 4 depicts another example process for controlling V2X service access, in accordance with some example embodiments.

FIG. 4 depicts an example of a process 400 for control of V2X services access, in accordance with some example embodiments. The description of FIG. 4 also refers to FIG. 1. The process 400 is similar in some respect to process 300, but in the example of process 400 the user equipment is allowed to directly contact the local V2X server 491, so the home V2X control function server 396 may be considered to have less control when compared to process 300.

Process 400 depicts a serving public land mobile network 390 such as the first public land mobile network 130, a user equipment 120 (which is entering the first public land mobile network 130 from the second public land mobile network 132), and a local V2X server 491. Process 400 also depicts a home public land mobile network 392 including a home subscriber server 394 and a home V2X control function server 396.

At 411, the user equipment 120 may attach to the first public land mobile network 130, in accordance with some example embodiments. For example, the user equipment 120 may initiate an attach procedure with network 130 by sending an attach message in accordance with 3GPP TS 23.401 as noted above with respect to 311.

At 412, the user equipment 120 may receive, in accordance with some example embodiments, information regarding local service information necessary to request the local V2X server access from a home V2X control function server as described above with respect to 312.

At 413, the user equipment 120 may send, in accordance with some example embodiments, a request to the local V2X server 491. This request may request local V2X service from local V2X server 491. The request may include the user identity such as user equipment's identity and/or sufficient information to allow the local V2X server 491 to identify the user equipment's home public land mobile network V2X control function server 396. In some instances, a different local V2X server may be reassigned by the local V2X server 491 to UE 120. When this is the case, the local V2X server 291 may send, at 417, information regarding a different local V2X server to serve UE 120.

At 414, the local V2X server 491 may send to the home public land mobile network V2X control function 396 a request for local V2X service access, in accordance with some example embodiments. For example, the user equipment may send its identity, application level user identity (e.g. IMSI), and/or the identity of its serving public land mobile network to enable server 396 to determine if the user equipment 120 has a V2X service subscription and/or is allowed to use a V2X service in the serving public land mobile network.

At 415, the home V2X control function server 396 may, in accordance with some example embodiments, access (or interact with) the home subscriber server 394 to obtain, for the user equipment associated with request 414, the subscription information for the user equipment.

At 416, the home V2X control function server 396 may, in accordance with some example embodiments, respond to the local V2X server 491 with an indication of whether the user equipment 120 is granted access to the V2X service. When there is an access grant, the local V2X server 491 may allow the user equipment 120 to use the local V2X server by returning a serving local V2X server address and/or information such as the USD needed to access for example the MBMS and the like at serving public land mobile network 130 to the user equipment 120 at 417. Once the user equipment discovers the serving local V2X server address, it can send V2X message to that V2X server directly and it can receive V2X message (e.g. via MBMS bearer).

Figure 5:
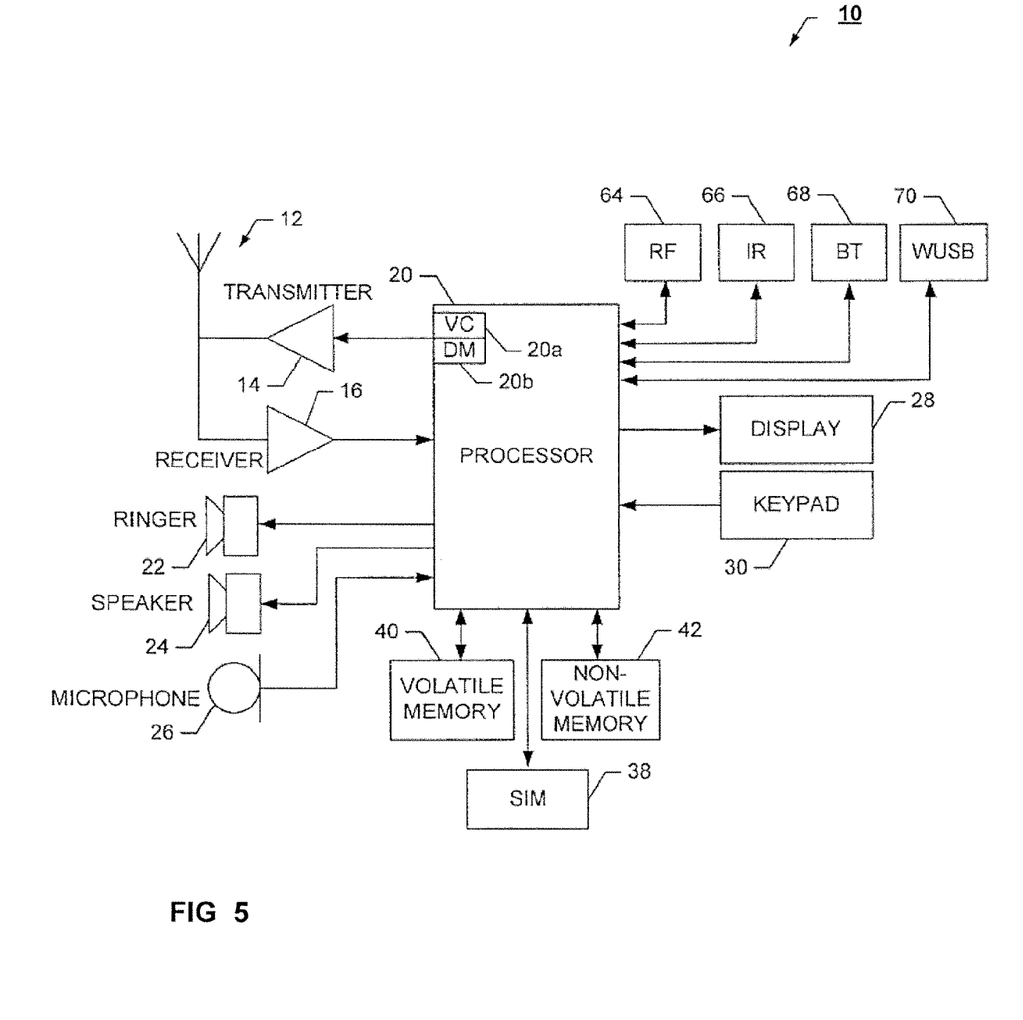
FIG. 5 depicts an example of an apparatus, in accordance with some exemplary embodiments.

FIG. 5 illustrates a block diagram of an apparatus 10, in accordance with some example embodiments. The apparatus 10 (or portions thereof) may be configured to provide user equipment 120. The user equipment may be implemented as any device including a wireless device, a smart phone, a cell phone, a machine type communication device, a V2X device, a wireless sensor or device at a vehicle, a network node, and/or any other processor-based device.

In some example embodiments, apparatus 10 may be configured to attach to a public land mobile network, receive local service information, request V2X service access, access a local V2X server, receive USD information, access a MBMS session, interact with a home V2X control function, and/or perform other operations as described herein including process 300, 400, and/or the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 112 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 112 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein with respect to the user equipment. The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein with respect to the user equipment.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In some example embodiments, the servers disclosed herein such as the local V2X server, the HSS, and the like may comprise at least one processor and at least one memory including program code which when executed by the at least one processor provides the operation disclosed for that server. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is improved access to services such as V2X service and/or other vehicle-based radio services.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method, comprising:
  receiving, by a user equipment, information of a local server configured to provide, in a serving public land mobile network, information regarding a vehicle-based service, when the user equipment enters a region of the serving public land mobile network;
  sending, by the user equipment, a request to the local server for the vehicle-based service, wherein the request comprises an identity of the user equipment to enable the local server to identify a home public land mobile network control function server of the user equipment, and to request access to the local server when subscription information for the user equipment indicates that the user equipment is allowed to access the vehicle-based service;
  in an instance in which the access is granted, receiving, by the user equipment and from the local server, an identity of the local server; and
  discovering, by the user equipment, the local server based on the received identity.

2. The method of claim 1, wherein the identity identifies the local server from at least another local server, wherein the local server is configured to support the region of the serving public land mobile network, and wherein the at least one other local server is configured to support at least one other region of the serving public land mobile network.

3. The method of claim 1, wherein the local server is configured to provide information regarding the vehicle-based service via at least a multimedia broadcast multicast services session in the serving public land mobile network associated with the local server.

4. The method of claim 1, wherein the local server comprises a vehicle-to-everything local server configured to provide at least user service description information for the vehicle-based service.

5. The method of claim 4 further comprising:
  receiving, by the user equipment, the user service description information from the vehicle-to-everything local server; and
  accessing, by the user equipment, the vehicle-based service provided by a multimedia broadcast multicast services session, wherein the accessing is based at least on the received user service description information.

6. The method of claim 1, wherein the identity is carried by a system information block transmitted by a base station in the serving public land mobile network.

7. The method of claim 1, wherein the identity is carried by at least one of a multicast control channel, a multimedia broadcast multicast services control channel, a single cell multimedia broadcast multicast services control channel, and a multicast traffic channel.

8. An apparatus, comprising:
  at least one processor; and
  at least one memory including computer program code, the at least one memory and the computer program code configured to, with the at least one processor, cause the apparatus to perform at least the following:
  receive, by the apparatus, information of a local server configured to provide, in a serving public land mobile network, information regarding a vehicle-based service, when the apparatus enters a region of the serving public land mobile network;
  send, by the apparatus, a request to the local server for the vehicle-based service, wherein the request comprises an identity of the apparatus to enable the local server to identify a home public land mobile network control function server of the apparatus, and to request access to the local server when subscription information for the apparatus indicates that the apparatus is allowed to access the vehicle-based service;
  in an instance in which the access is granted, receive, by the apparatus and from the local server, an identity of the local server; and
  discover, by the apparatus, the local server based on the received identity.

9. The apparatus of claim 8, wherein the identity identifies the local server from at least another local server, wherein the local server is configured to support the region of the serving public land mobile network, and wherein the at least one other local server is configured to support at least one other region of the serving public land mobile network.

10. The apparatus of claim 8, wherein the local server is configured to provide information regarding the vehicle-based service via at least a multimedia broadcast multicast services session in the serving public land mobile network associated with the local server.

11. The apparatus of claim 8, wherein the local server comprises a vehicle-to-everything local server configured to provide at least user service description information for the vehicle-based service.

12. The apparatus of claim 11, wherein the apparatus is further caused to at least receive the user service description information from the vehicle-to-everything local server and access the vehicle-based service provided by a multimedia broadcast multicast services session, wherein the accessing is based at least on the received user service description information.

13. The apparatus of claim 8, wherein the identity is carried by a system information block transmitted by a base station in the serving public land mobile network.

14. The apparatus of claim 8, wherein the identity is carried by at least one of a multicast control channel, a multimedia broadcast multicast services control channel, a single cell multimedia broadcast multicast services control channel, and a multicast traffic channel.

15. The apparatus of claim 8, wherein the identity is in a common format accessible by other apparatus in other serving public land mobile networks.

16. The apparatus of claim 8, wherein the request to access the local server causes the home network to retrieve subscription information from a home subscriber server.

17. The apparatus of claim 8, wherein the request to access the local server causes the home network to send domain name service query to a domain name server and receive local server address from the domain name server.

18. The apparatus of claim 8, wherein the request to access the local server causes the local server to send request for local vehicle-to-everything access to home network and receive response from the home network.

19. The apparatus of claim 8, wherein the home network comprises a home vehicle-to-everything control function.

20. The apparatus of claim 8, wherein the serving public land mobile network is a visited public land mobile network.

* * * * *